United States Patent [19]

Daeges

[11] Patent Number: 5,020,636

[45] Date of Patent: Jun. 4, 1991

[54] PIEZOELECTRIC LUBRICATING DEVICE FOR A BEARING

[75] Inventor: Johannes Daeges, Lichtenfels, Fed. Rep. of Germany

[73] Assignee: Siemens Aktiengesellschaft, Munich, Fed. Rep. of Germany

[21] Appl. No.: 579,083

[22] Filed: Sep. 7, 1990

Related U.S. Application Data

[63] Continuation of Ser. No. 378,151, Jul. 11, 1989, abandoned.

[30] Foreign Application Priority Data

Jul. 11, 1988 [DE] Fed. Rep. of Germany ....... 3823497

[51] Int. Cl.$^5$ ............................................. F01M 1/00
[52] U.S. Cl. ................................. 184/6.26; 184/6.1; 184/7.4; 184/55.1; 239/102.2
[58] Field of Search ............... 184/5.1, 6.1, 6.4, 6.26, 184/7.4, 55.1, 108; 384/448, 476, 467; 239/102.2, 75

[56] References Cited

U.S. PATENT DOCUMENTS

| | | | |
|---|---|---|---|
| 992,503 | 5/1911 | Howard | 184/55.1 |
| 2,853,948 | 9/1958 | Aspelin | |
| 2,912,064 | 11/1959 | Friedell | 184/6.26 |
| 3,520,641 | 7/1970 | Casey | |
| 3,674,112 | 7/1972 | Roberts | 184/6.4 |
| 4,276,857 | 7/1981 | Martin | 239/102.2 |
| 4,284,174 | 8/1981 | Salvana et al. | 184/6.26 |
| 4,388,343 | 6/1983 | Voss et al. | 425/107 |
| 4,519,751 | 5/1985 | Begkman et al. | |
| 4,527,661 | 7/1985 | Johnstone et al. | 184/6.1 |
| 4,774,909 | 10/1988 | Dolderer | 123/1 A |

FOREIGN PATENT DOCUMENTS

| | | |
|---|---|---|
| 0078420 | 5/1983 | European Pat. Off. . |
| 0078421 | 5/1983 | European Pat. Off. . |
| 1453655 | 3/1971 | Fed. Rep. of Germany . |
| 3421082 | 12/1985 | Fed. Rep. of Germany . |
| 1282158 | 12/1960 | France . |
| 0165255 | 6/1921 | United Kingdom ............... 184/6.26 |

OTHER PUBLICATIONS

German Publication: "Kugellager-Zeitschrift", 208, 1981, S.4 to 10.

*Primary Examiner*—Ira S. Lazarus
*Assistant Examiner*—Alan B. Cariaso
*Attorney, Agent, or Firm*—Herbert L. Lerner; Laurence A. Greenberg

[57] ABSTRACT

A lubricating device for a bearing across which a gas pressure gradient exists includes a piezoelectric tubule operating as a pump receiving a lubricant and introducing the lubricant into a propellant gas stream passing through the bearing due to a pressure gradient across the bearing. At least one sensor determines the operating state of the bearing and an electric current supply is connected between the at least one sensor and the piezoelectric tubule.

41 Claims, 2 Drawing Sheets

PIEZOELECTRIC LUBRICATING DEVICE FOR A BEARING

This application is a continuation of application Ser. No. 378,151, filed July 11, 1989, now abandoned.

The invention relates to a lubricating device for a bearing across which there is a gas pressure gradient, especially a bearing that rotates at high speed. The invention is usable, for example, in a ball bearing, needle bearing or a roller bearing, such as in a spindle for a machine tool.

In a bearing, it is important to maintain optimal conditions for lubrication. In a high-speed roller bearing, for example, the efficiency is highly dependent on the correctly metered quantity of lubricant. If there is too much lubricant, the friction work to be performed is great, and the energy used by the bearing increases markedly. Naturally, this reduces the efficiency of the system in which the bearing is used. In contrast, if there is inadequate lubrication, the film of lubricant separates. The bearing runs hot, and in an extreme case can seize. Tests on roller bearings, such as those described in the publication "Kugellager-Zeitschrift" [Ball Bearing Journal] 208, 1981, pp.4–10 and especially FIG. 1, have shown that even slight changes in the quantity of oil supplied to the bearing per unit of time can take it outside the optimal operating range. Previously, for safety reasons, the size of the bearing and the lubricant delivery were often set in such a way that operation took place outside the optimal range. The goal, however, is to adhere to the optimal range as well and as continuously as possible.

The prior art includes what is known as oleo-pneumatic lubrication, as seen particularly FIG. 4 of the aforementioned reference. With such lubrication, a small quantity of oil which is metered mechanically is supplied at certain time intervals through a relatively long tube that leads to the bearing. The oil is distributed gradually in a uniformly thin film along the wall of the tube by compressed air and gravity. Upon reaching the end of the tube in the vicinity of the bearing, the film separates. The resultant small particles of lubricant are carried into the bearing though the use of the compressed air guided through the bearing. In other words, these particles are introduced into the bearing because of the gradient across the bearing, which is due to the compressed air. With this conventional kind of lubrication, the goal is to supply the bearing continuously at a predetermined metering rate, even though the lubricant itself is fed discontinuously. In order to attain this goal, the aforementioned long tube is indispensable. It is only when the tube is at least a certain minimum length, and only with the resultant long flow times under the influence of compressed air and gravity, that it is possible to distribute the metered oil on the tube wall into a uniform film, before the particles separating from the film at the outlet opening are transported by the air stream into the nearby bearing. Due to the long flow time, with this kind of conventional lubricating system, any change in the bearing lubrication does not occur until many minutes or even hours later after a change in the metering quantity.

It is clear from the above that the optimal operating point in the lubrication is very difficult to adjust. In fact, adjusting this operating point entails a certain amount of risk. Furthermore, it is clear that the metering cannot respond quickly enough to changing lubricating conditions.

It is accordingly an object of the invention to provide a piezoelectric lubricating device for a bearing, which overcomes the hereinafore-mentioned disadvantages of the heretofore-known devices of this general type and which does so in such a way that sufficiently fine metering of the lubrication is possible, in order to enable operation in the vicinity of the optimal operating range of the bearing. Moreover, it should be possible to provide rapid adaptation to the lubricant requirement of the bearing, that is within seconds.

With the foregoing and other objects in view there is provided, in accordance with the invention, a lubricating device for a bearing, especially a high-speed bearing, across which a gas pressure gradient exists, comprising a piezoelectric tubule operating as a pump receiving a lubricant and introducing the lubricant into a flowing propellant gas stream passing through the bearing due to a pressure gradient across the bearing, at least one sensor determining the operating state of the bearing, and an electric current supply connected between the at least one sensor and the piezoelectric tubule.

In accordance with another feature of the invention, the propellant gas stream flows past the piezoelectric tubule in a given direction, and the piezoelectric tubule ejects lubricant droplets into the propellant gas stream in the given direction. The additional metering of the lubricant can be adapted to the instantaneous lubricant requirement of the bearing very much faster in this way. In such a case, the additionally metered quantity of lubricant is instantaneously ejected into the propellant gas flowing in the same direction and is transported with it directly into the bearing. This eliminates a distribution along the wall of the lubricant tube that otherwise takes place in other lubricating devices operated with compressed air and results in a time lag for carrying it into the bearing. This feature is also an essential precondition to assuring that a precisely defined quantity of lubricant which is supplied will in fact directly reach the bearing without excessively great losses along the wall.

In accordance with a further feature of the invention, the electric current supply varies at least one of the size and/or the number of the lubricant droplets per unit time by varying the amplitude and number of electrical voltage pulses per unit time. This feature allows the meterability of the lubricant to be markedly improved. This gives the operator two control variables with which he can quickly adapt the lubricant metering to the need at the time, within wide limits.

In accordance with an added feature of the invention, the piezoelectric tubule is subjected to high-frequency pulses. If the piezoelectric tubule is connected to a high-frequency voltage source for this purpose, then the voltage source can be operated intermittently. This can be done either with unequally long pauses and/or unequally long ON times.

In accordance with an additional feature of the invention, there is provided a guide tube surrounding the piezoelectric tubule, the guide tube having a shape and disposition or installation carrying the ejected droplets directly into the bearing without prior wall contact and with minimized turbulence of the propellant gas or medium stream. This improves the precise additional metering of given quantities of lubricant. Due to the streamlined installation of the lubricant delivery tube and piezoelectric tubule in the guide tube, turbulence is reduced as much as possible, and this provision also prevents significant quantities of expelled lubricant droplets from being delayed by contact with the wall and reaching the bearing.

In accordance with yet another feature of the invention, there is provided a guide tube for the propellant gas stream which is preferably formed of metal, the tubule being disposed in the guide tube.

In accordance with yet a further feature of the invention, there is provided a position holder axially securing the tubule in the guide tube, the position holder is preferably star-shaped and formed of metal.

In accordance with yet an added feature of the invention, the tubule has a lubricant outlet end with a tapering outlet opening.

In accordance with yet an additional feature of the invention, there is provided an embedding compound in which the tubule is retained.

In accordance with still another feature of the invention, the tubule has a lubricant inlet end, and there is provided a lubricant delivery tube disposed at the inlet end which is preferably formed of metal.

In accordance with still a further feature of the invention, there is provided a guide tube for the propellant gas stream, the tubule being disposed in the guide tube, and the lubricant delivery tube passing laterally into the guide tube.

In accordance with still an added feature of the invention, there is provided a sealing sleeve for the lateral passage of the lubricant delivery tube into the guide tube, the sealing sleeve preferably being formed of an electrically insulating material.

In accordance with still an additional feature of the invention, the guide tube has a cross section for the propellant gas stream, an inlet end with an inlet piece widening the cross section, and an outlet end with an outlet piece constricting the cross section.

In accordance with again another feature of the invention, the tubule has a lubricant outlet end with a tapering outlet opening disposed in the constricting outlet piece.

In accordance with again a further feature of the invention, there is provided an overpressure generator for the propellant gas stream being connected to the inlet piece, the outlet piece being disposed directly at the bearing to be lubricated.

In accordance with again an added feature of the invention, there are provided means for providing an oil of predetermined viscosity as the lubricant, and means for providing an air stream as the propellant gas stream.

In accordance with again an additional feature of the invention, the tubule is formed of a piezoelectric ceramic and preferably has an inside diameter of approximately 1 mm.

In accordance with another feature of the invention, there is provided a lubricant delivery tube communicating with the tubule, a check valve communicating with the lubricant delivery tube, and a lubricant container communicating with the check valve.

In accordance with a further feature of the invention, there is provided an embedding compound in which the tubule is disposed, the lubricant delivery tube ending in the embedding compound.

In accordance with an added feature of the invention, there is provided a closed-loop control circuit in which the piezoelectric tubule is a correcting element.

In accordance with an additional feature of the invention, the control circuit is a temperature control circuit which is intended for monitoring the bearing temperature.

In accordance with yet another feature of the invention, the at least one sensor is a temperature sensor monitoring the bearing to be lubricated, the electric current supply includes a regulator supplying the piezoelectric tubule, and the regulator has an input side connected to the temperature sensor.

In accordance with yet a further feature of the invention, there is provided an rpm sensor giving a set-point value to the regulator.

In accordance with yet an added feature of the invention, the control circuit controls at least one of the frequency and the electrical voltage to which the tubule can be subjected. A voltage of a predetermined level and frequency can be applied to the connections, and by way of this voltage the output rate and droplet speed can be adapted to the need at the time.

In accordance with a concomitant feature of the invention, there is provided a lubricant delivery tube supplying lubricant to the tubule, a guide tube surrounding the tubule, a position holder supporting the tubule in the guide tube, a first electrical connection communicating with the tubule through the lubricant delivery tube, and a second electrical connection communicating with the tubule through the guide tube and the position holder.

Due to the use of a piezoelectric tubule, which is operated as a "micropump", it is possible to adapt the metering very quickly to changing lubrication conditions. As a result, it is even possible to operate at the optimal operating point. If a closed-loop control circuit having a temperature sensor is used, then the optimal operating point can be adhered to sensitively. If insufficient lubrication occurs, this is expressed in a temperature rise, which is detected by means of the temperature sensor, which in turn adjusts the micropump (piezoelectric tubule) accordingly through an electronic control or a regulator. The metering can be regulated very fast in this way. The droplets of lubricant expelled by the micropump are so small, and their chronological succession can be adjusted in such a way, that even the smallest deviations from the optimal operating point can be intercepted. In other words, the closed-loop control circuit assures that the optimal operating point is attained and adhered to automatically, or in other words without intervention by a human operator.

Other features which are considered as characteristic for the invention are set forth in the appended claims.

Although the invention is illustrated and described herein as embodied in a piezoelectric lubricating device for a bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
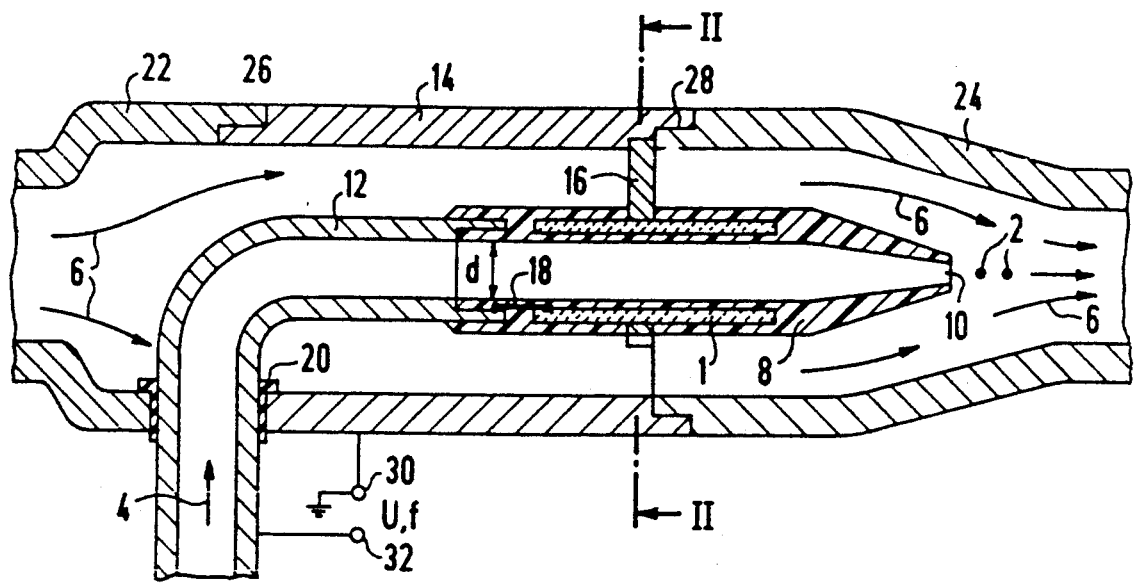
FIG. 1 is a fragmentary, diagrammatic, sectional view of a lubricating device for a bearing.

Referring now to the figures of the drawing in detail and first, particularly, to FIG. 1 thereof, there is seen a a lubricating device for a high-speed bearing that contains key element in the form of a piezoelectric tubule 1, which may in particular be made from a piezoelectric ceramic. The piezoelectric tubule 1 is used as a pump, especially as a so-called micropump. The micropump is controllable externally by electrical pulses, which have a voltage U and a repetition frequency f. The micropump assures that in the metering process, superfine droplets 2 of a lubricant 4, which have a diameter of less than 100μ, are controllably ejected into a propellant gas stream 6 flowing through the bearing to be lubricated. The piezoelectric tubule 1 may, for instance, have a length of 13 mm, an outside diameter of 2.1 mm and an inside diameter of 1 mm or less. It is known that such a piezoelectric tubule 1 contracts when acted upon by an electrical pulse. This reduces its internal volume and ejects a droplet 2 of liquid from its interior. If the liquid droplets 2 have a size of of approximately 80 μm, output yields of several meters per second are attainable with such piezoelectric tubules 1. A reverse flow of lubricant 4 can be greatly delayed or even prevented by a throttle valve or by a check valve 46, as suggested in FIG. 3. The dimensions of such a throttle valve would, for instance, have to be selected in such a way that the expulsion of a lubricant droplet 2 was not hindered, yet a refilling flow of lubricant 4 after the end of the contraction was still possible, for instance by capillary action.

Accordingly, a conventional piezoelectric tubule 1 is used in this case for the microfine metering of a lubricant 4 and for discharging the expelled droplets 2 into a propellant gas stream 6 which flows through the bearing to be lubricated and is of the kind used previously for the aforementioned oleo-pneumatic lubrication. It is accordingly possible in principle for the known oleo-pneumatic lubricating devices to be retrofitted with the lubricating device according to the invention.

In FIG. 1, the tubule 1 is embedded or retained in a sheath or embedding compound 8. The embedding compound 8 which, for instance, is a plastic, covers the inner wall surface of the tubule 1 as well. The open inside diameter d inside the piezoelectric tubule 1 is thus less than 1 mm. The embedding compound 8 extends past both ends of the tubule 1. At the outlet end for the lubricant 4, the embedding compound 8 is provided with a tapering outlet opening 10. This increases the expulsion speed for the droplets 2. The tapering outlet opening 10 is thus associated with the tubule 1 at the outlet end for the lubricant 4.

Figure 3:
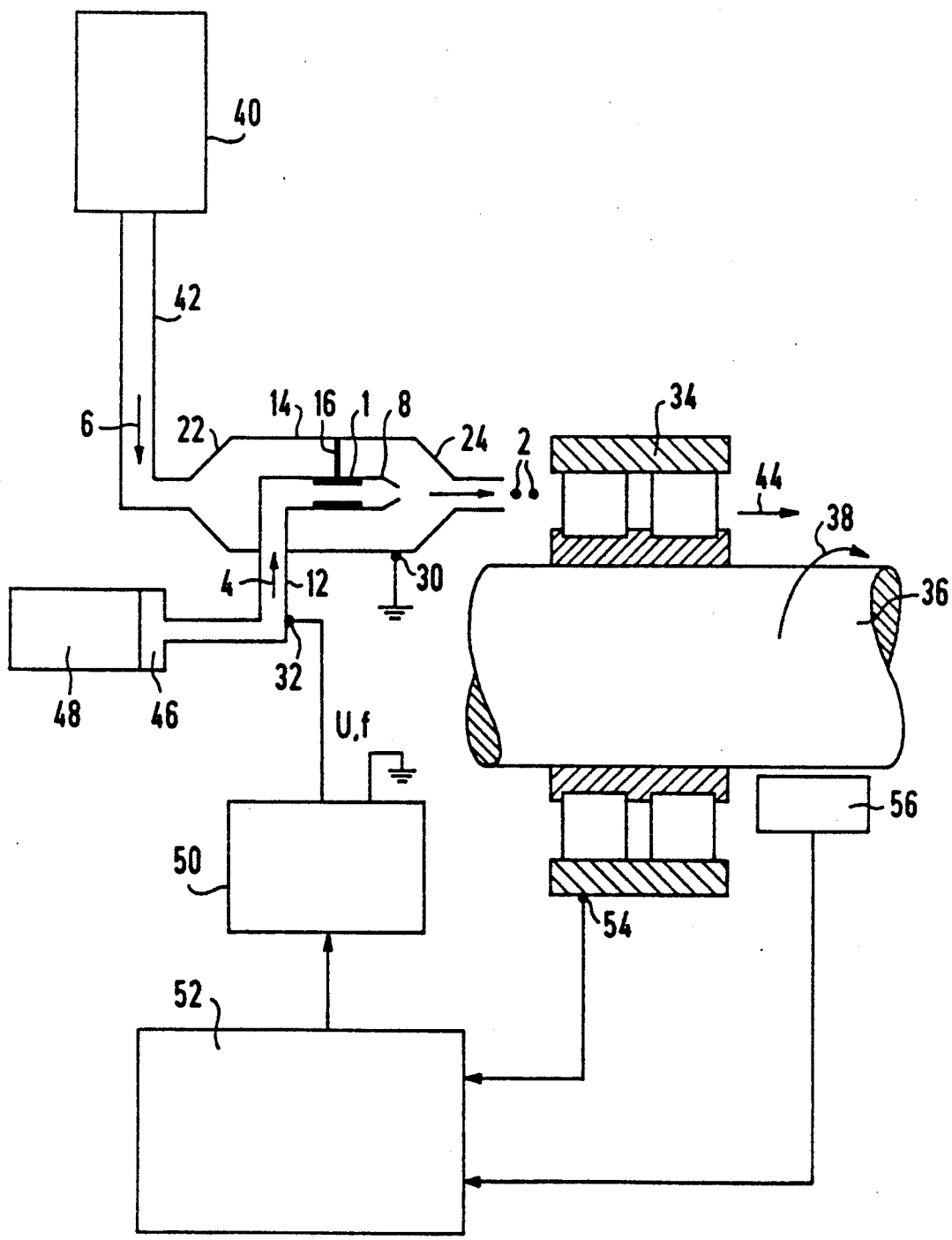
FIG. 3 is a diagrammatic and block circuit diagram of a lubricating device for a high-speed roller bearing, which is used in a closed-loop temperature control circuit.

At the inlet end for the lubricant 4, the tubule 1 is provided with a lubricant delivery tube 12, in particular made of a metal. The device is specially constructed in such a way that the lubricant delivery tube 12 ends inside the embedding compound 8. The lubricant delivery tube 12 communicates with a lubricant container through a check valve. The check valve and the lubricant container are shown in FIG. 3 and described below.

Figure 2:
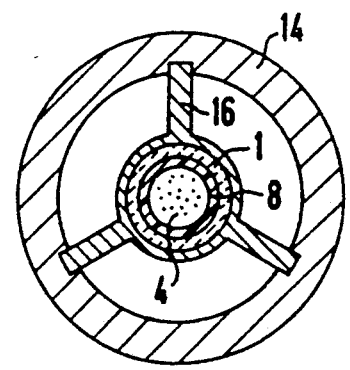
FIG. 2 is a sectional view of the lubricating device taken along the line II—II of FIG. 1 in the direction of the arrows.

It can be seen from FIGS. 1 and 2 that the tubule 1 is accommodated in a guide tube 14 for the propellant gas 6. The guide tube 14 is preferably also made of metal. The tubule 1 and the embedding compound 8 are axially retained in the guide tube 14 in a special manner. This is accomplished by a position holder 16 which is constructed in a star-shaped form with a central ring, as shown in FIG. 2. This position holder 16 once again is preferably made of metal. The annular central portion of the position holder rests closely against the sheath or embedding compound for the piezoelectric tubule 1 and thus contacts its outer electrode. The inner electrode is provided with a pickup line 18, which establishes an electrical connection with the lubricant delivery tube 12. The lubricant delivery tube 12 is passed through the side of the guide tube 14 and is bent at an angle of 90° in the interior. In order to provide the passage through the side of the tube, a sealing sleeve 20 is provided, which is preferably made of an electrically insulating material, such as plastic.

The inlet end of the guide tube 14 for the propellant gas 6 has an inlet piece 22 that enlarges the cross section for the propellant gas stream 6. Correspondingly, on the outlet end it has an outlet piece 24 that constricts the cross section of the propellant gas stream 6. The two pieces 22, 24 can each be fitted onto the end of the guide tube 14, which permits easy assembly. Plug-in holders for this purpose are shown at reference numerals 26 and 28. The plug-in holder 28 simultaneously serves to retain the ends of the three arms of the position holder 16. In order to avoid turbulence in the propellant gas stream 6, the tapering outlet opening 10 is located in the constricting outlet piece 24, but in a region without negative pressure, or with only insignificant negative pressure. Thus the development of turbulence in the propellant gas 6 is avoided as much as possible. The lubricant 4 is thus introduced into the propellant gas 6 in the form of the droplets 2, without swirling. Since it would allow them to contact the wall, swirling would merely hinder individual lubricant droplets from reaching the bearing points at the right time.

An oil of a predetermined viscosity is preferably used as the lubricant 4. Compressed air, which is supplied by an overpressure generator, is preferably provided as the propellant gas 6.

It is also clear from FIG. 1 that two electrical connections 30, 32 receive the electrical voltage U applied at the frequency f. The connection 30, which in this case is especially applied to ground or ground potential, is connected to the outer electrode of the piezoelectric tubule 1 through the guide tube 14 and the three arms of the position holder 16 as well as the central ring thereof. In contrast, the connection 32 is connected to the inner electrode of the tubule 1 through the lubricant delivery tube 12 and the connecting line 18. The sealing sleeve 20 is used for insulation in this case. Naturally, other routes for connecting the connections 30, 32 with the respective outer and inner electrodes may be selected.

FIG. 3 shows the form in which the piezoelectric tubule 1 can be used as a correcting element in a closed-loop control circuit, in this case especially a temperature control circuit. The temperature control circuit is used in this case in connection with a roller bearing 34, which is provided for retaining a shaft 36 that rotates at high speed. The rotation of the shaft 36 is indicated by a curved arrow 38. A gas pressure gradient which is built up by the delivered propellant gas 6, develops across the roller bearing 34. In order to maintain this gradient, an overpressure generator 40 is used, which in particular is a compressed air pump that is connected to an air line 42, which in turn communicates with the inlet piece 22. In order to reinforce the overpressure generator 40, or in other words to increase the gas pressure gradient, a negative pressure generator may be provided on the remote side of the roller bearing 34, as indicated by an arrow 44 representing suction. The outlet piece 24 is positioned directly in front of the bearing 34 to be lubricated, or in other words at a slight distance from it, in order to keep the control time short and also to prevent drifting of the droplets 2 toward the wall of the outlet piece 24 and into areas outside the bearing 34. In this way, the lubricant 4 is thus introduced into the bearing 34 in a directed manner.

In FIG. 3, the lubricant delivery tube 12 is connected through the check valve 46 to a lubricant container 48. The container need not necessarily be under pressure, since transporting of the lubricant 4 is effected by the known effect of capillary action.

The connections 30, 32 are connected to outputs of an electric pulse transducer 50. The transducer is a component of the control circuit and assures that the frequency f and/or the electrical voltage U that is imposed on the tubule 1 is controlled by the control circuit. To this end, the pulse transducer is connected to the output of a control logic unit 52. The essential function performed by the control logic unit 52 is that of a regulator. The input side of the control logic unit 52 is connected to a temperature sensor 54 that monitors the bearing 34 to be lubricated. The input side of the control logic unit 52 is also connected to an rpm sensor 56, which detects the rotational speed of the shaft 36. The output signal of the rpm sensor 56 is used in the control logic unit 52 for ascertaining an rpm-dependent base value or set-point value for the lubrication. At a fixed rpm, the lubrication is adjusted and thus optimized by the control logic unit 52 in accordance with the temperature ascertained by the temperature sensor 54. If the temperature rises, this is an indication of inadequate lubrication, and the control logic unit 52 adapts the metered lubricant quantity accordingly. The control logic unit 52 can decide whether an increase or decrease in the quantity of lubricant is indicated. For instance, if there is a temperature increase, the control logic unit 52 can attempt to lower the temperature by increasing the delivery of lubricant. If that does not work, then after some time the control logic unit 52 reduces the quantity of lubricant again, until the temperature drops below a minimum temperature value. This is the optimal operating temperature to be set.

It is clear from the function of the temperature control circuit shown in FIG. 3 that the discharge of lubricant 4 in minimum quantities by means of the tubule 1 permits an optimal adaptation to the lubricant requirement. The proximity of the metering to the lubricating site, and the direct transport of the lubricant 4 by the propellant gas 6 into the bearing 34, lead to a direct action for adaptation or correction of the lubricant quantity. This action begins extraordinarily quickly and the control time of the control circuit is in the seconds range.

The control circuit is self-optimizing, without requiring intervention by a human operator. The pulse transducer can generate individual pulses, or can switch a high-frequency alternating voltage source on and off in pulses. In this way, either individual droplets or successions of droplets of lubricant can be discharged in pulses. Additionally, the droplet size can be adapted to a given requirement by varying the electrical signal amplitude and/or signal frequency.

What is claimed:

1. Lubricating device for a bearing across which a gas pressure gradient exists, comprising a piezoelectric tubule operating as a pump receiving a lubricant and introducing the lubricant into a propellant gas stream flowing past said piezoelectric tubule in a given direction and passing through the bearing due to a pressure gradient across the bearing, said piezoelectric tubule ejecting lubricant droplets into the propellant gas stream in said given direction, at least one sensor determining the operating state of the bearing, and an electric current supply connected between said at least one sensor and said piezoelectric tubule.

2. Lubricating device according to claim 1, wherein said electric current supply varies at least one of the size and the number of the lubricant droplets per unit time by varying the amplitude and number of electrical voltage pulses per unit time.

3. Lubricating device according to claim 1, wherein said electric current supply subjects said piezoelectric tubule to high-frequency pulses.

4. Lubricating device according to claim 1, including a guide tube surrounding said piezoelectric tubule, said guide tube having a shape and disposition carrying the ejected droplets directly into the bearing without prior wall contact and with minimized turbulence of the propellant gas stream.

5. Lubricating device according to claim 1, including a guide tube for the propellant gas stream, said tubule being disposed in said guide tube.

6. Lubricating device according to claim 5, wherein said guide tube is formed of metal.

7. Lubricating device according to claim 5, including a position holder axially securing said tubule in said guide tube.

8. Lubricating device according to claim 7, wherein said position holder is star-shaped and is formed of metal.

9. Lubricating device according to claim 1, wherein said tubule has a lubricant outlet end with a tapering outlet opening.

10. Lubricating device according to claim 1, including an embedding compound in which said tubule is retained.

11. Lubricating device according to claim 1, wherein said tubule has a lubricant inlet end, and including a lubricant delivery tube disposed at said inlet end.

12. Lubricating device according to claim 11, wherein lubricant delivery tube is formed of metal.

13. Lubricating device according to claim 11, including a guide tube for the propellant gas stream, said tubule being disposed in said guide tube, and said lubricant delivery tube passing laterally into said guide tube.

14. Lubricating device according to claim 13, including a sealing sleeve for the lateral passage of said lubricant delivery tube into said guide tube.

15. Lubricating device according to claim 14, wherein said sealing sleeve is formed of an electrically insulating material.

16. Lubricating device according to claim 5, wherein said guide tube has a cross section for the propellant gas stream, an inlet end with an inlet piece widening said cross section, and an outlet end with an outlet piece constricting said cross section.

17. Lubricating device according to claim 16, wherein said tubule has a lubricant outlet end with a tapering outlet opening disposed in said constricting outlet piece.

18. Lubricating device according to claim 16, including an overpressure generator for the propellant gas stream being connected to said inlet piece, said outlet piece being disposed directly at the bearing to be lubricated.

19. Lubricating device according to claim 1, including means for providing an oil of predetermined viscosity as the lubricant, and means for providing an air stream as the propellant gas stream.

20. Lubricating device according to claim 1, wherein said tubule is formed of a piezoelectric ceramic.

21. Lubricating device according to claim 1, wherein said tubule has an inside diameter of approximately 1 mm.

22. Lubricating device according to claim 1, including a lubricant delivery tube communicating with said tubule, a check valve communicating with said lubricant delivery tube, and a lubricant container communicating with said check valve.

23. Lubricating device according to claim 22, including an embedding compound in which said tubule is disposed, said lubricant delivery tube ending in said embedding compound.

24. Lubricating device according to claim 1, including a closed-loop control circuit in which said piezoelectric tubule is a correcting element.

25. Lubricating device according to claim 24, wherein said control circuit is a temperature control circuit.

26. Lubricating device according to claim 25, wherein said at least one sensor is a temperature sensor monitoring the bearing to be lubricated, said electric current supply includes a regulator supplying said piezoelectric tubule, and said regulator has an input side connected to said temperature sensor.

27. Lubricating device according to claim 26, including an rpm sensor giving a set-point value to said regulator.

28. Lubricating device according to claim 24, wherein said control circuit controls at least one of the frequency and the electrical voltage to which said tubule can be subjected.

29. Lubricating device according to claim 1, including a lubricant delivery tube supplying lubricant to said tubule, a guide tube surrounding said tubule, a position holder supporting said tubule in said guide tube, a first electrical connection communicating with said tubule through said lubricant delivery tube, and a second electrical connection communicating with said tubule through said guide tube and said position holder.

30. Lubricating device according to claim 1, including a guide tube for the propellant gas stream, a lubricant delivery tube passing through said guide tube and being connected to said tubule, and a sealing sleeve electrically insulating said delivery tube from said guide tube.

31. Lubricating device according to claim 1, including a guide tube surrounding said tubule and having an outlet end constricting the propellant gas stream.

32. Lubricating device according to claim 1, including a guide tube surrounding said tubule and having a tapering outlet constricting the propellant gas stream.

33. Lubricating device according to claim 1, including an overpressure generator for the propellant gas stream, and a guide tube surrounding said tubule having an inlet connected to said overpressure generator and an outlet facing the bearing to be lubricated.

34. Lubricating device according to claim 1, wherein said given direction is in a substantially straight direction toward the bearing to be lubricated.

35. Combination, comprising a bearing across which a gas pressure gradient exists, and a lubricating device for said bearing including a piezoelectric tubule operating as a pump receiving a lubricant and introducing the lubricant into a propellant gas stream flowing past said piezoelectric tubule in a given direction and passing through said bearing due to a pressure gradient across said bearing, said piezoelectric tubule ejecting lubricant droplets into the propellant gas stream in said given direction, at least one sensor determining the operating state of said bearing, and an electric current supply connected between said at least one sensor and said piezoelectric tubule.

36. Lubricating device for a bearing comprising:
(a) a piezoelectric tubule operating as a pump receiving a lubricant and introducing the lubricant into the bearing, said tubule having a lubricant inlet end;
(b) an embedding compound in which said tubule is retained;
(c) a tapering outlet opening associated with said embedding compound;
(d) a lubricant delivery tube disposed at said inlet end of said tubule;
(e) a temperature sensor monitoring the bearing to be lubricated and measuring the temperature thereof; and
(f) electric control means operatively connected to said piezoelectric tubule for supplying an electric voltage and a frequency thereto, said electric control means having an input side connected to said temperature sensor for controlling at least one of said frequency and said voltage in dependence on the temperature measured by said temperature sensor.

37. The lubrication device according to claim 36, wherein said tapering outlet opening is disposed directly at the bearing to be lubricated.

38. The lubrication device according to claim 36, including means for providing an oil of predetermined viscosity as the lubricant.

39. The lubrication device according to claim 36, wherein said tubule is formed of a piezoelectric ceramic.

40. The lubrication device according to claim 36, including a check valve communicating with said lubricant delivery tube, and a lubricant container communicating with said check valve.

41. The lubrication device according to claim 36, wherein said control means has a regulator, and including an rpm sensor for giving a set-point value to said regulator.

* * * * *